Jan. 10, 1933.  S. RASMUSSEN  1,893,598
VAPORIZING TUBE WITH GAS CONNECTION
Filed Nov. 22, 1929
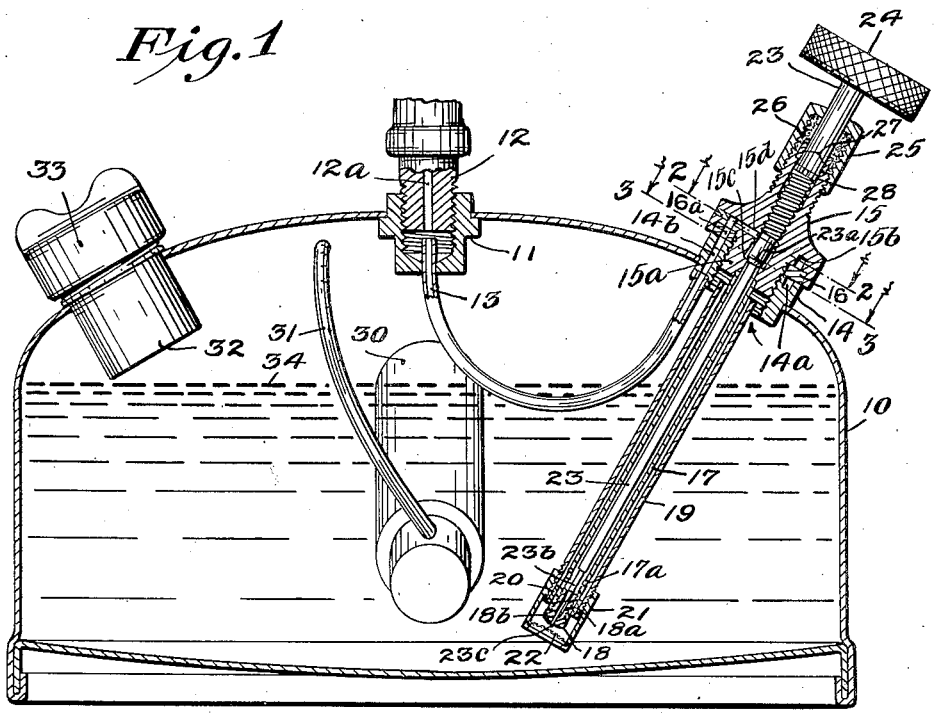
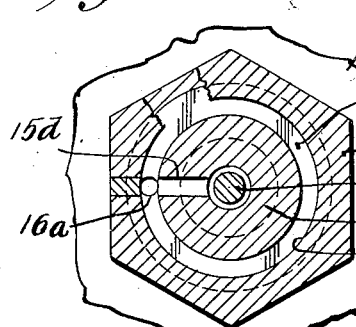
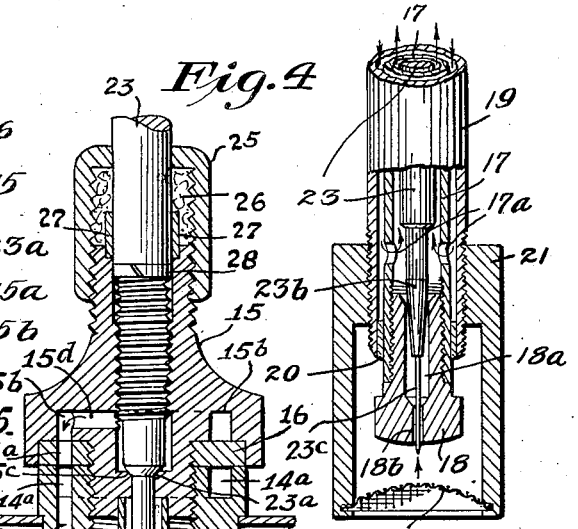
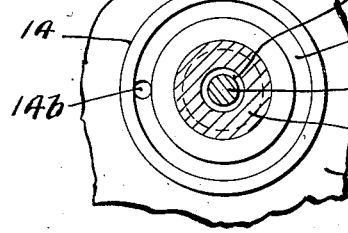
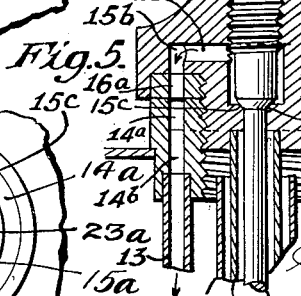
Inventor
Sophus Rasmussen
By his Attorneys Patented Jan. 10, 1933

1,893,598

UNITED STATES PATENT OFFICE

SOPHUS RASMUSSEN, OF ALBERT LEA, MINNESOTA, ASSIGNOR TO AMERICAN GAS MACHINE COMPANY, OF ALBERT LEA, MINNESOTA, A CORPORATION OF DELAWARE

VAPORIZING TUBE WITH GAS CONNECTION

Application filed November 22, 1929. Serial No. 409,064.

This invention relates to a device for burning liquid vaporizing fuel, such as hydrocarbon fuel and while the invention is applicable to various devices, it has been especially designed to be used with lamps or heating devices having a fuel tank at the base thereof. It is desirable to equip such devices with a novel form of starting mechanism, one form of which is shown and described in the Olsen and Rasmussen application, S. N. 283,579. When such a starting mechanism is applied to a device having a fuel tank as a base, it is desirable to have the conduit or tube connecting the starting device and the passage leading to the burners within the fuel tank or container so that it will not be liable to be struck and damaged. The starting device comprises a tube disposed in the fuel container having an open upper end which should be disposed in the air space in the tank above the fuel. It is also desirable to have the device carrying the starting mechanism readily removable from the fuel tank.

It is an object of this invention, therefore, to provide a fuel container having a member secured thereto with a passage leading to the burners, a starting device carried on the wall of the fuel tank, and comprising a member carrying a valve stem and conduits, said member having a chamber therein together with means including a tube disposed in the fuel tank for connecting said chamber and said first mentioned member.

It is another object of the invention to provide a device having a fuel tank supporting a member with a passage therein leading to the burners, said fuel tank having permanently secured in the wall thereof a second member having a chamber therein, a tube connecting said chamber to said first mentioned member, a device removably mounted in said second member comprising tubes projecting into the fuel tank, a valve stem extending to the exterior of the tank and having turning means thereon, said device comprising a member secured to said second member and having a chamber therein communicating with one of said conduits and with the chamber in said second member.

It is more specifically an object of the invention to provide a fuel container carrying a burner supporting member, a member secured in the wall of said container, and having a chamber therein, a tube disposed within said container and connecting said chamber and burner supporting member, a second member removably threaded into said first mentioned member and carrying a tube projecting into the fuel in said container, said second member having a chamber therein communicating with said tube, a sealing member between said second member and first mentioned member having a passage therethrough affording communication between said chambers.

These and other objects and advantages of the invention will be fully set forth in the following description made in connection with the accompanying drawing, in which like reference characters refer to similar parts throughout the several views, and in which:—

Fig. 1 is a vertical central section through the lower portion of a lamp, heater, or other device having a fuel tank forming a base;

Fig. 2 is a section taken on line 2—2 of Fig. 1 as indicated by the arrows;

Fig. 3 is a section taken on line 3—3 of Fig. 1 as indicated by the arrows;

Fig. 4 is a view partly in side elevation and partly in vertical section showing the lower end of the starting device used; and Fig. 5 is a view on an enlarged scale illustrating certain of the parts as shown in Fig. 1.

Referring to the drawing, a portion of a device adapted to burn liquid vaporizing fuel is shown which comprises a liquid fuel container 10. Said container 10 is shown as having secured centrally in its top a plug 11 having a flange abutting the inner side of the wall of container 10 and having a threaded opening at its upper end into which is screwed a conduit 12 forming a standard for the device and having a passage 12a centrally therethrough for conveying fuel to a burner. Member 11 has an opening in its lower end into which is secured one end of a tube 13 disposed in the container 10, the other end of which is secured to a member 14 illustrated as of general cylindrical shape, said member being permanently secured as by soldering or brazing onto the wall of container 10. Member 14 has a chamber 14a therein which is in the form of an annular groove, 14a. Member 14 also has a passage 14b leading from groove 14a to its inner end and tube 13 is connected to member 14 in alignment with passage 14b so that it communicates therewith. Member 14 is provided with a central bore which is threaded to receive the threaded portion 15a of a member 15, the major portion of which is disposed without the tank 10 and which has a diameter slightly larger than the member 14. Member 15 has a chamber therein in the form of an annular groove 15b of substantially the same diameter as the groove 14a in member 14. A washer 16 is disposed between members 14 and 15 and embraced by a depending flange on the latter, which washer is of somewhat soft yielding material, such as lead. The washer 16 forms a sealing means between members 14 and 15, but the same has a hole 16a therethrough spaced from the center or axis of member 15 the same distance as the groove 15b so that said hole connects grooves 15b and 14a. The portion 15a of member 15 is provided with bores of slightly different diameter, a valve seat 15c being formed therein. A hole or passage 15d connects groove 15b with the bore of larger diameter in member 15. The bottom of said portion is also bored to have secured therein a tube 17 which extends downward to adjacent the bottom of the container 10 where it has threaded thereinto a terminal plug 18. The plug 18 has a central bore 18a at its upper end and a much reduced passage or bore 18b extending through its lower end. Tube 17 has adjacent its bottom a pair of oppositely disposed holes 17a therethrough. A tube 19 is secured to the tube 17 adjacent its bottom by means of a short bushing or sleeve 20 disposed between said tubes and tube 19 extends upwardly and has an open upper end disposed in the central bore of member 14. A cap member 21 is threaded onto the bottom of tube 19 having a central chamber therein enclosing the bottom of said tube and plug 18, said cap member having a screen cloth 22 of fine mesh secured in its lower end and extending thereacross. Member 15 is internally threaded adjacent its upper end to have screwed thereinto the threaded portion of a valve stem 23. This stem has a valve-forming beveled portion 23a thereon cooperating with the valve seat 15c. Said stem is of reduced diameter below portion 23a so as to be of considerably smaller diameter than the internal diameter of tube 17 and extends to adjacent the bottom of tube 17, where it has a further reduced and tapered portion 23b extending into the larger portion 18a of the bore in plug 18 and said stem further has a small needle portion 23c extending from portion 23b adapted to pass through the small passage 18b in the bottom of plug 18. Stem 23 has an operating wheel 24 at its upper end. A packing cup 25 is threaded on the upper end of member 15 and packing material 26 is compressed between the inner wall thereof and a sleeve 27 secured to the stem 23, said stem thus being effectively packed. A small split washer 28 is placed onto the stem 23 in a groove just above the threaded portion thereof and prevents cap 25 and sleeve 27 from slipping off of the stem when said stem is removed.

A portion of a pump cylinder 30 is shown in Fig. 1 as extending into container 10 and a tube 31 extends from the lower end of said cylinder to a point adjacent the top of container 10. Container 10 is also provided with a sealing plug 32 provided with a closing cap 33.

In operation a liquid vaporizing fuel, such as gasoline is placed in the container 10 to a suitable level, as indicated by the dash lines 34. This fuel is then placed under pressure by pumping air into the tank by means of pump 30 which has a handle equipped piston accessible from the outside of tank 10. When it is desired to light the burner the operator will turn wheel 24 opening valve 23a, gasoline enters tube 17 by passing through passages 18b and 18a in plug 18. The air under pressure enters the top of tube 19 and passes downwardly therein. When valve 23a is opened vaporized fuel which has collected in the upper portion of tube 17 passes through said valve and the pressure of air in the tank causes air to pass down in tube 19 through the opening 17a into tube 17 and to continue to carry a mixture of vaporized fuel and air out through tube 17. This mixture of air and vaporized fuel passes through the bore in member 15 around valve stem 23, through passage 15d and into chamber or groove 15b. From the chamber 15b the air and gaseous fuel pass through hole 16a into the chamber or groove 14a and from groove 14a the same pass through hole 14b into tube 13 and to member 12 where they go through the passage 12a to the burners. It will be seen that no matter in what position washer 16 may be the hole 16a will always connect the grooves 15b and 14a so that the fuel can pass as described. It is necessary to have the upper end of tube 17 of considerable height so that it will be in the air space in container 10. It is also desirable to be able to remove member 15, with tubes 17 and 19 and cap 21 for cleaning purposes. With the present structure this can be readily done by merely unscrewing member 15 from member 14. When this is done the connection between member 14 and member 12 is not disturbed. At the same time tube 13 is disposed within the container 10 where it will not be struck and bent or loosened as it would be quite liable to be were it disposed at the exterior of tank 10.

From the above description it is seen that applicant has provided a very simple, compact and convenient structure for the device and the starting mechanism therefor. The exposed parts are all quite rigid and rugged and there is no danger of injuring the same. The desired removability of the parts is also attained. The structure has been amply demonstrated in actual practice and is being commercially made.

It will, of course, be understood that various changes may be made in the form, details, proportions and arrangement of the parts, without departing from the scope of applicant's invention, which, generally stated, consists in a device capable of carrying out the objects above set forth, in the novel parts and combinations of parts disclosed and defined in the appended claims.

What is claimed is:—

1. In a device for burning a liquid vaporizing fuel, the combination of a fuel container, a first member mounted in the walls of the chamber and having an open topped chamber at its upper end, a second member releasably applied to said first member and having an open bottomed chamber overlying said first mentioned chamber, a sealing member interposed between portions of said first and second members, and closing said two chambers, said sealing member having an opening therethrough permitting communication between said two chambers, means for supplying fuel to said second mentioned chamber from said fuel container and a conduit having communication with said first mentioned chamber for supplying fuel to a burner.

2. The structure defined in claim 1, and a valve for controlling said fuel supplying means.

3. In a device for burning a liquid vaporizing fuel, the combination of a fuel container, a first member secured in the wall of said container and having an annular groove at its outer end, a second member applied to said first member and having an annular groove overlying said first mentioned groove, a sealing member interposed between said first and second members and having an opening therethrough affording communication between said two grooves, means for supplying fuel to said second mentioned groove and a conduit having communication with said first mentioned groove for supplying fuel to a burner.

4. A device for burning a liquid vaporizing fuel having in combination, a fuel container forming a base member, a delivery conduit extending upward from said fuel container, forming a standard, and adapted to supply fuel to a burner, a first member secured in the wall of said container and having a chamber therein, a second member removably secured to said first member and having a chamber therein, means affording communication between said two chambers, a tube located within said fuel container and affording communication between said first mentioned chamber and said conduit and means for supplying fuel from said container to said second mentioned chamber.

5. In a device for burning liquid vaporizing fuel, the combination of a fuel container forming a base member, a conduit mounted in said base member for supplying fuel to a burner, a first member secured in the wall of said container and having an annular groove at its outer end, a second member releasably applied to said first member and having an annular groove in its lower surface overlying said first groove, a sealing washer interposed between said two members and having an opening therethrough affording communication between said two grooves, means for supplying fuel to said second mentioned groove and a tube located within said fuel container and affording communication between said first mentioned groove and said conduit.

6. In a device for burning liquid vaporizing fuel, the combination of a fuel container, a conduit mounted in said fuel container for supplying fuel to a burner, a first member mounted in the wall of said container and having a groove in its upper end and a screw threaded bore, a second member having a screw threaded plug fitting within said bore and having a portion overlying the groove in said first mentioned member, the said portion having an open bottomed groove therein, a packing washer interposed between said two members and closing the grooves thereof, said packing washer having an opening therethrough affording communication between said grooves, a tube secured to said plug and projecting downwardly into the lower portion of said container and having communication therewith, a second tube surrounding said first tube and having communication with the upper portion of said container, said first tube having a passage therethrough permitting communication between said two tubes, said plug having a passage extending from said first tube to said second mentioned groove and a tube affording communication between said first mentioned groove and said conduit.

7. The structure defined in claim 6, and a valve controlling said last mentioned passage.

8. In combination, a fuel supply reservoir having liquid fuel under air pressure, a bushing disposed through a wall of said reservoir, a fuel supply pipe communicating with said bushing, means disposed in said bushing communicating the liquid and air spaces of said reservoir with said pipe, a valve structure for controlling said communicating means, said means and valve structure being removable from said bushing.

9. In combination, a fuel supply reservoir having liquid fuel under air pressure, a bushing disposed through a wall of said reservoir, a fuel supply pipe communicating with said bushing, means disposed in said bushing communicating the liquid and air spaces of said reservoir with said pipe, a valve structure for controlling said communicating means, said means and valve structure being removable from said bushing and sealing members between said valve structure and bushing.

In testimony whereof I affix my signature.

SOPHUS RASMUSSEN.